Inventor
Andre Heraud

Patented Mar. 2, 1954

2,671,125

UNITED STATES PATENT OFFICE 2,671,125

SHEATH-INSULATED FLAT-CELL BATTERY

André Héraud, Saint-Ouen, France, assignor to Societe Anonyme dite: Societe des Piles Wonder, Saint-Ouen, France Application October 1, 1951, Serial No. 249,037
Claims priority, application France December 22, 1950

2 Claims. (Cl. 136—132)

The present invention has for its object a battery composed of a plurality of flat cells piled on one another and characterized thereby that it is provided with a sheath intended to provide for its preservation.

One is aware that in such piles of cells care must be taken to prevent an early drying of the battery. The drying-out process will occur mainly between each pair of adjacent cells. The remedy resorted to generally consists in dipping the whole cell pile into wax in order to seal the joints.

Unfortunately, as a consequence of a swelling process occurring within each cell, the wax seal may happen to crack, so that possibility is given to the electrolyte to ooze out; where the cells are so closely related to one another that the electrolyte leakages will merge with one another, the whole pile of cells thus affected are connected with the leak circuit and are exhausted within a short time.

In certain designs of flat-element electric batteries where the zinc anode is accessible from the outside, this being the case with cells which provide a complete electro-chemical chain and which can be tested individually from the outside of the pile, the occurrence of a leak in any one of the cells is sufficient, if the electrolyte happens to make contact with the anode of the next one, to put said cell out of circuit. Since the process will extend gradually to the successive cells, the whole battery soon becomes unserviceable.

According to the present invention, a method of manufacturing an electric battery of the type formed of a series of superposed flat cells, in which each cell is mounted in a frame of plastic material, comprising the steps of treating a tubular sheath of plastic material having a dimension slightly less than the peripheral dimensions of each cell frame, with a volatile solvent which acts for enlarging and softening the sheath and as a solvent for the plastic material of the cell frames, and of slipping the treated sheath over the superposed cells, whereby, on evaporation of the solvent the sheath shrinks, thus pressing the cells together axially and at the same time the inner surface of the sheath becomes united with the peripheral outer wall of the frame of each cell.

The invention will be described hereinafter with reference to the appended drawing in which.

Figure 1:
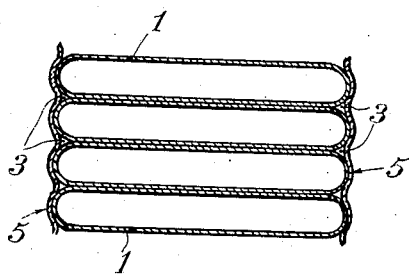
Figure 1 is a sectional view of a first embodiment of the invention.
Figure 2:
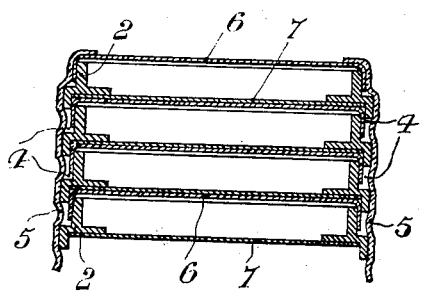
Figure 2 is a similar view of a further embodiment.

The piled cells comprise a frame 1 (Fig. 1) and 2 (Fig. 2).

It is at the joint 3 between the two frames that electrolyte can ooze out or evaporation take place (see Fig. 1). Fig. 2 illustrates a further embodiment which is the one adopted preferably by applicant. As shown in this figure, the leakage is liable to occur at 4 between the frame 2 of the piled up cells each of which comprises an anode 6 which overlaps the edges of its own frame and a cathode 7.

According to the invention, the wax which conventionally is cast into the joints 3 and 4 is replaced by a tubular sheath made of a plastic material adapted to wrap the whole pile of cells and also, while severing the latter from the outside and thereby preventing evaporation, to separate the cells from one another.

With this end in view, the said sheath 5 is cemented throughout the periphery of each cell to the plastic material of which the frame of the cell is made and seals each joint between two adjacent cells in a peripheral chamber 3 (Fig. 1) and 4 (Fig. 2).

Said peripheral chamber is fluid-tight and, at the same time as it severes the cells from the outside and thereby does away with evaporation, it also makes it possible to dispense with the wax and provides an expansion chamber if the electrolyte should happen to swell.

The said plastic sheath is slipped on the pile after it has been softened by a preparatory immersion in a low-boiling solvent. The evaporation of the solvent is attended with a shrinkage of the sheath.

The softening liquid should be a solvent for the material the cell frame is made of as well as for the plasticizer in the sheath, so that subsequent to the evaporation process the sheath will be cemented to the cell frames and consequently the peripheral chamber will be made fluid-tight.

An additional advantage of these provisions is that it is no longer necessary to hoop the various cells associated into a series as it has been of common practice by winding a connecting tape around the pile of cells in order to keep them pressed against one another, since the shrinking of the sheath providing the subject-matter of the invention will by itself take care of such a compression in proportion as the solvent evaporates. It is only necessary in slipping the sheath over the cell pile, to let said sheath extend a little beyond the terminal cells of the pile, as a result of which the latter is pressed together axially. As shown in the figures, the sheath will contract into the spaces between the frames, as a consequence of which the sheath is no longer strictly cylindrical. Such a shrinking will result in an improvement in the sealing action of the sheath.

For a non-limitary example, the cell frames may be made of polystyrene or polyethylene, the sheath wrapping the cell pile being a tube of vinyl chloride smaller in diameter than the pile and the solvent being trichlorethylene.

What I claim is:

1. A method of manufacturing an electric battery of the type formed of a series of superposed flat cells, in which each cell is mounted in a frame of plastic material, comprising the steps of treating a tubular sheath of plastic material having a dimension slightly less than the peripheral dimensions of each cell frame, with a volatile solvent which acts for enlarging and softening the sheath and as a solvent for the plastic material of the cell frames, and of slipping the treated sheath over the superposed cells, whereby, on evaporation of the solvent the sheath shrinks, thus pressing the cells together axially and at the same time the inner surface of the sheath becomes united with the peripheral outer wall of the frame of each cell.

2. A method as claimed in claim 1, in which the sheath is made of vinyl chloride, the cell frames of polystyrene or polyethylene and the solvent is trichlorethylene.

ANDRÉ HÉRAUD.

References Cited in the file of this patent

UNITED STATES PATENTS

| Number | Name | Date |
|---|---|---|
| 1,277,147 | St. Armande | Aug. 27, 1918 |
| 2,475,152 | Rock | July 5, 1949 |

FOREIGN PATENTS

| Number | Country | Date |
|---|---|---|
| 423,165 | Great Britain | Jan. 28, 1935 |
| 554,926 | Great Britain | July 26, 1943 |
| 558,207 | Great Britain | Dec. 24, 1943 |
| 617,001 | Great Britain | Jan. 31, 1949 |